United States Patent [19]

Kester et al.

[11] Patent Number: 5,266,365

[45] Date of Patent: Nov. 30, 1993

[54] EPOXY POLYMERIC NONLINEAR OPTICAL MATERIALS

[75] Inventors: John J. Kester; H. Craig Silvis, both of Midland, Mich.

[73] Assignee: The Dow Chemical Company, Midland, Mich.

[21] Appl. No.: 843,494

[22] Filed: Feb. 28, 1992

Related U.S. Application Data

[62] Division of Ser. No. 441,805, Nov. 27, 1989, Pat. No. 5,112,934.

[51] Int. Cl.$^5$ .......................... C08G 59/40; G02F 1/00
[52] U.S. Cl. ........................................ 428/1; 428/413;
525/481; 525/482; 525/483; 525/484; 525/502;
525/503; 525/504; 525/526; 525/89; 525/90;
525/91; 525/93; 525/94; 525/99; 528/100;
528/101; 528/103; 528/104; 528/107; 528/108;
528/109; 528/112; 528/113; 528/114; 528/120;
528/121; 528/123; 528/124; 528/220; 528/222;
528/223; 528/224; 528/225; 528/229; 528/327;
528/361; 528/365; 528/373; 528/391; 528/393;
528/399; 528/402; 528/407; 528/418; 528/420;
549/550; 549/552; 252/582; 252/583; 252/585;
252/589; 385/129; 385/130

[58] Field of Search .................. 549/550, 552; 528/420,
528/89, 402, 90, 373, 91, 327, 93, 121, 94, 120,
99, 222-225, 100, 112-114, 101, 109, 103, 107,
104, 108, 220, 123, 229, 124, 391, 393, 407, 399,
361, 365, 418; 525/481, 504, 526, 482, 483, 484,
502, 503; 428/1, 428, 413

[56] References Cited

U.S. PATENT DOCUMENTS

| | | | |
|---|---|---|---|
| 4,540,769 | 9/1985 | Dobinson et al. | 528/407 |
| 4,762,901 | 8/1988 | Dhein et al. | 528/73 |
| 4,764,581 | 8/1988 | Muller et al. | 528/100 |

FOREIGN PATENT DOCUMENTS 907844 10/1962 United Kingdom.

OTHER PUBLICATIONS

M. Eich et al., *J. Appl. Phys.*, 66(7):3241-3247 (1989).
R. Reck et al., *SPIE*, 1147:74-83 (1989).

*Primary Examiner*—Frederick F. Krass

[57] ABSTRACT

The present invention is directed to an epoxy-containing polymeric material having nonlinear optical properties, particularly a glycidyl amine polymer, and a process for making the nonlinear optical (NLO) epoxy-containing polymeric material including poling the polymeric material under high voltage at elevated temperature for a period of time to bring about orientation of the nonlinear optical functionalities in the polymer. The polymers have enhanced thermal stability and good NLO properties.

39 Claims, No Drawings

EPOXY POLYMERIC NONLINEAR OPTICAL MATERIALS

CROSS-REFERENCE TO RELATED APPLICATION

This is a divisional of application Ser. No., 441,805 filed Nov. 27, 1989, now U.S. Pat. No. 5,112,934.

FIELD OF THE INVENTION

The present invention relates to polymeric organic materials which possess nonlinear optical (NLO) properties, and more particularly, the present invention relates to epoxy-containing polymeric nonlinear optical materials which are useful in nonlinear optical devices, and a process for preparing the NLO materials.

BACKGROUND OF THE INVENTION

Information is more rapidly processed and transmitted using optical as opposed to electrical signals. There exists a need for finding nonlinear optical materials, and processes for preparing such materials, which alter the transmission of optical signals or serve to couple optical devices to electrical devices, i.e., electrooptic devices.

Some materials which have been used in electrooptic devices include semiconductors such as lithium niobate, potassium titanyl phosphate and gallium arsenide and most recently, organic materials which have been doped with nonlinear optical materials. Generally, polymeric organic materials can or may have the specific advantages of fast response time, small dielectric constant, good linear optical properties, large nonlinear optical susceptibilities, high damage threshold, engineering capabilities, and ease of fabrication.

There are various known polymeric organic materials which possess specific nonlinear optical properties and various known processes for making such polymeric organic materials. Many of the current polymeric organic materials prepared by the prior art are prepared by blending a NLO molecule into a polymer host material. "Blending" herein means a combination or mixture of materials without significant reaction between specific components.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 183. The above-recited publications are incorporated herein by reference.

EP 218,938 discloses one method of making a polymer with nonlinear optical properties by incorporating molecules which have nonlinear optical (NLO) properties into a host polymer. The NLO molecules are incorporated into the host polymer by blending. The NLO molecules in the polymer can be aligned by an electric field while the temperature of the polymeric material is raised above its glass transition temperature and then cooled to room temperature. EP 218,938 discloses a number of polymer host materials, including epoxies, and many types of molecules which have NLO activity including azo dyes such as disperse red 1.

PCT Application WO8802131A also describes a method of blending a substance having nonlinear optical properties, such as 2-methyl-4-nitroaniline, into a commercially available curable epoxy resin polymer to prepare an electrooptical material.

It is also known to incorporate a NLO active group such as azo dye Disperse Red 1 (4,-[N-ethyl-N-(2-hydroxyethyl] amino-4-nitro azobenzene), by simply blending the azo dye in a thermoplastic material such as poly(methylmethacrylate), as described in Applied Physics Letters 49(5), 4 (1986). In this paper, an aromatic amine is disclosed but the amine is not covalently bonded to the polymer chain. In addition, the paper discloses an NLO molecule which has an electron donor and acceptor group at either end of the molecule.

A problem associated with a polymer with NLO properties produced by simply blending NLO molecules into a host polymer is that these polymer materials lack stability of orientation, i.e., there is a great amount of molecular relaxation or reorientation within a short period of time resulting in a loss of NLO properties. For example, as reported by Hampsch et al., Macromolecules 1988, 21, 528–530, the NLO activity of a polymer with NLO molecules blended therein decreases dramatically over a period of days.

Generally, the incorporation of molecular structures which have NLO activity into the backbone of a polymer chain will decrease the likelihood of the structural reorganization in comparison with polymers in which the NLO active molecule is simply blended. It is therefore desirable to provide a polymer material with NLO groups covalently bonded to the backbone of the polymer material to minimize relaxation effects.

U.S. Pat. No. 4,703,096 discloses a polymer composition in which the NLO activity is derived from aromatic structures attached to a polymeric diacetylenic backbone. However, the synthesis of the material described in U.S. Pat. No. 4,703,096 is complicated.

There is a continuing effort to develop new nonlinear optical polymers with increased nonlinear optical susceptibilities and enhanced stability of nonlinear optical effects. It would be highly desirable to have organic polymeric materials, particularly polymeric materials based on epoxy resins, with larger second and third order nonlinear properties than presently used inorganic electrooptic materials.

It is desired to provide a NLO molecule with ends having both donors with an acceptor being in the middle. It is further desired to tie both ends of a NLO active molecule into a polymer chain to provide enhanced stability over other NLO molecules in which only one end is tied to the polymer backbone.

There are two main problems which are associated with polymeric nonlinear optical materials. The first problem is dilution of the NLO effect of a polymer. Dilution of the NLO effect occurs, for example, when a molecule possessing nonlinear optical coefficients is added to a host material having only linear optical properties. As an illustration, it has been shown, in U.S. patent application Ser. No. 441,783, filed of even data herewith by J. J. Kester, that materials like diamino diphenylsulphone (DADS) and oxydianiline (ODA) exhibit a nonlinear optic susceptibility. When the nonlinear optical molecules, such as DADS or ODA, are incorporated into a crosslinked structure of an epoxy polymer, films with second and third harmonic generating capabilities are produced. However, the concentration of NLO molecules in these crosslinked polymers may be diluted by the presence of an epoxy resin which has very low NLO susceptibilities relative to the DADS and ODA.

The second problem associated with polymeric nonlinear optical materials is relaxation of orientation of NLO groups within an oriented polymer due to thermal processes.

The relaxation of the NLO effect has been documented in the literature, for example, in the aforementioned reference H. Hampsch et al., Macromolecules 21, p. 528-530. These relaxation can occur at room temperature and be well below the glass transition, Tg, of the polymer.

Monomers having glycidyl groups such as tetraglycidylsulfonyldianiline, are disclosed in the reference, W. T. Hodges et al., "Evaluation of Experimental Epoxy Monomers", SAMPE Quarterly, Volume 17, No. 1, Oct. 1, 1985, pp 21-25.

It would be highly desirable to provide an epoxy monomer having nonlinear properties and to provide epoxy based polymeric nonlinear optical materials with improved NLO properties and improved relaxation properties.

An object of the present invention is to provide an epoxy based polymers which exhibit nonlinear optical effects and which have enhanced stability of nonlinear optical effects.

SUMMARY OF THE INVENTION

One broad aspect of the present invention is a non-linear optical material comprising an epoxy-containing polymeric material composition having non-linear optical properties. For example, the epoxy-containing polymeric material of the present invention contains glycidyl groups.

Another aspect of the present invention is a non-linear optical composition characterized by the following formulae:

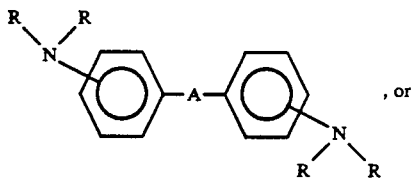

, or where A is a divalent electron-withdrawing group; n is 2 or 3; each R is independently a hydrogen, an epoxy-containing group or an aliphatic or aromatic hydrocarbon having from 1 to about 12 carbon atoms, with the proviso that at least two R groups on different nitrogen groups

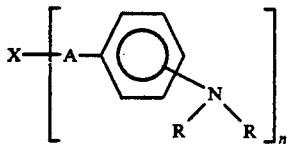

must be epoxy-containing groups; and X is a divalent or trivalent organic hydrocarbon, hetero-interrupted hydrocarbon, or substituted hydrocarbon radical or

Another broad aspect of the invention is a process for making a nonlinear optical composition of the above formulae.

DETAILED DESCRIPTION OF PREFERRED EMBODIMENTS

In accordance with the present invention, it has been discovered that the relaxation properties of NLO polymers follow the same sequential order as the glass transition (Tg) of the polymers. Therefore, to improve the stability of these NLO polymers, the Tg of the polymers should be increased. The glass transition of, for example, diamino diphenylsulphone (DADS) cured polymers is typically between 200°-220° C. when using, for example, a bifunctional bisphenol A type epoxy resin. Accordingly, in the present invention, the use of a multi-functional epoxy resin with NLO capabilities would provide improvements over dilution of the NLO crosslink and thermal relaxation properties.

In its broadest scope, the composition of the present invention includes a nonlinear optical material comprising an epoxy-containing polymeric material having nonlinear optical susceptibility. By "epoxy-containing group" herein means a group containing an epoxide group

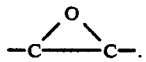

Epoxy-containing groups useful in this invention include a wide variety of epoxy-containing groups. The epoxy group may be internally, terminally, or in cyclic structures. The epoxy-containing group can be for example a glycidyl group

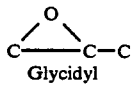
Glycidyl formed from the reaction of an epihalohydrin such as epichlorohydrin. The epoxy-containing group can also be formed from oxidation of olefin containing chains or cycloaliphatic dienes such as:

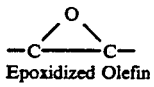
Epoxidized Olefin

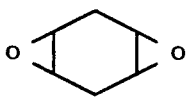
Epoxidized Cyclodienes

Generally, the nonlinear optical material comprises an epoxy-containing composition exhibiting non-linear optical properties containing per molecule (a) at least two epoxy-containing groups attached to more than one of the nitrogen atoms which is attached to an aromatic ring and (b) at least one divalent electron-withdrawing group attached to an aromatic ring.

Because of the presence of a charge asymmetry in the polymer of the present invention, the present invention polymer with a noncentrosymmetric molecular configuration advantageously exhibits second order nonlinear optical susceptibility.

One embodiment of the present invention is a nonlinear optical material comprising an epoxy-containing polymeric material composition having non-linear optical properties and characterized by the following formula:

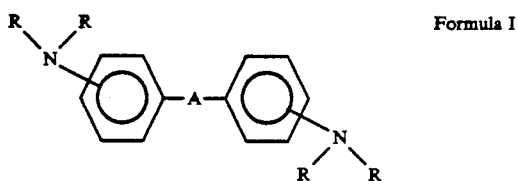

Formula I wherein A is an electron-withdrawing molecule and each R is independently a hydrogen, an epoxy-containing group, or an aliphatic or aromatic hydrocarbon having from 1 to about 12 carbon atoms, with the proviso that at least two R groups must be glycidyl groups on different nitrogen groups; said composition exhibiting nonlinear properties.

Another embodiment of the present invention is a nonlinear optical material comprising an epoxy-containing polymeric material composition having non-linear optical properties and characterized by the following formula:

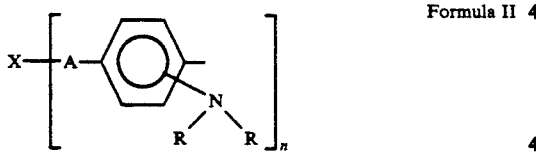

Formula II where A is a divalent electron-withdrawing group; n is 2 or 3; each R is independently a hydrogen, an epoxy-containing group or an aliphatic or aromatic hydrocarbon having from 1 to about 12 carbon atoms with the proviso that at least two R groups must be epoxy-containing groups on different nitrogen groups; and X is a divalent or trivalent organic hydrocarbon, hetero-interrupted hydrocarbon, or substituted hydrocarbon radical or

The epoxy-containing groups are preferably glycidyl groups. Thus, one embodiment of the Formula I above of a nonlinear optical composition of the present invention having glycidyl groups may be generally described by the following general formula:

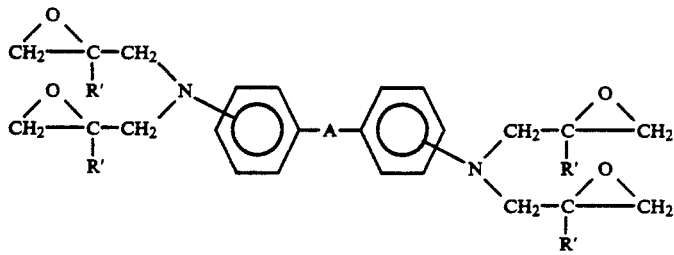

where A is a divalent electron-withdrawing group and and each R' is independently a hydrogen or a alkyl group containing from 1 to about 4 carbon atoms.

The electron-withdrawing group A of the above formulae is chemically bonded between two substituents of the resultant product composition. The term "electron-withdrawing" as employed herein refers to organic substituents which attract π-electrons from a conjugated electronic structure. Illustrative of electron-withdrawing substituents as represented by A in the above formulae may be, for example.

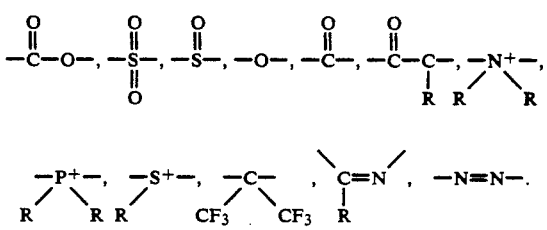

wherein R is independently hydrogen or an aliphatic or aromatic hydrocarbon having from 1 to about 12 carbon atoms.

The term "conjugating" group as employed herein refers to a group which has the ability to transfer charge from the electron-donating group to the electron withdrawing group through a conjugated system of double bonds. Conjugating groups include groups which have, for example, a hydrocarbyl diradical composed of aromatic rings optionally linked by carbon-carbon, carbon-nitrogen, or nitrogen-nitrogen double bonds. This conjugating group may be substituted with pendant radicals such as alkyl, aryl, cyano, halo, and nitro.

The term "electron-donating" group as employed herein refers to organic substituents which contribute π-electrons to a conjugated electronic structure. An electron donating group can be, for example, —NH$_2$.

Another more preferred embodiment of the Formula I above of a non-linear optical composition of the present invention is a tetraglycidylsulfonyldianiline (TGDDS) which can be described by the following general formula:

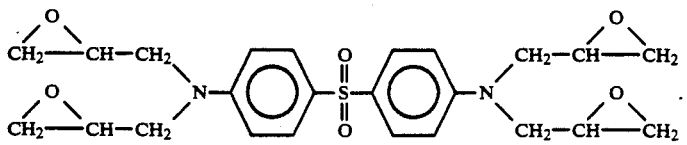

Both the 3,3' and 4,4'-isomers of TGDDS are suitably used herein.

Another more preferred embodiment of the Formula I above of a non-linear optical composition of the present invention is a tetraglycidylcarbonyldianiline (TGCDA) which can be described by the following general formula:

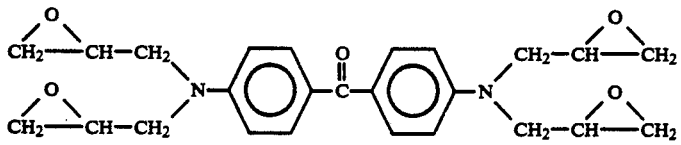

The epoxy monomers and oligomers of the present invention having glycidyl groups may be prepared by known methods such as described in U.S. Pat. Nos. 4,814,414 and 4,521,583 and W. T. Hodges et al., "Evaluation of Experimental Epoxy Monomers", SAMPE Quarterly, Volume 17, No. 1, October 1985, pp 21–25, all (incorporated herein by reference.)

In carrying out the process of the present invention, the glycidyl amine epoxy-containing compounds of the present invention is prepared by reaction of the parent amine compound with a halohydrin including, but not limited to, epichlorohydrin or epibromohydrin followed by further reaction with a basic material such as aqueous sodium hydroxide. The reaction is carried out at elevated temperature (50°–60° C.) and at atmospheric pressure. A catalyst may be used to facilitate reaction between the parent amine and the halohydrin, such as benzyltrimethyl ammonium chloride, however, it is not essential that a catalyst be present for reaction to occur.

The present invention also provides a reaction product composition resulting from reacting, as a first component (A) at least one epoxy-containing compound exhibiting non-linear optical properties containing per molecule (a) at least two epoxy-containing groups attached to more than one nitrogen atoms which is attached to an aromatic ring and (b) at least one divalent electron-withdrawing group attached to an aromatic ring with, as a second component (B) at least one curing agent for component (A).

Component (A) is any of the glycidyl amine epoxy compounds described above with reference to Formulae I and II.

The second component (B) of the present invention is a curing agent for component (A).

Component (B) of the present invention may comprise substantially all of one curing agent compound or component (B) may be a mixture of two or more curing agent compounds. The curing agent compound suitably used herein may be a compound which does not exhibit a NLO response, a compound which does exhibit a NLO response or a combination thereof. For example, curing agent compounds which exhibit a NLO response and which may be used in the present invention may be those compounds described in U.S. patent application Ser. No. 441,783, filed of even date herewith, by J. J. Kester, incorporated herein by reference. An example of a curing agent disclosed in U.S. Ser. No. 441,783 which exhibits a NLO response and may be suitably used herein is diaminodiphenylsulfone.

Other curing agents which exhibit a NLO response and which can be used herein are disclosed in U.S. application Ser. No. 441,731, filed of even date herewith, by J. J. Kester; incorporated herein by reference. An example of a curing agent disclosed in U.S. Ser. No. 441,731 which exhibits a NLO response and may be suitably used herein is paranitroaniline.

Examples of other curing agents which can be used in the present invention include, for example, the amines disclosed in U.S. Pat. Nos. 4,659,177; 4,707,303 and 4,707,305 which are hereby incorporated by reference, such as quinodimethane compounds, diphenoquinodimethane compounds and naphthoquinodimethane compounds.

Other suitable curing agent compounds which can be employed herein as component (B) include, for example, amines, acids or anhydrides thereof, biguanides, imidazoles, urea aldehyde resins, melamine-aldehyde resins, phenolics, halogenated phenolics, sulfides, combinations thereof and the like. These and other curing agents are disclosed in Lee and Neville's *Handbook of Epoxy Resins*, McGraw-Hill Book Co., 1967 which is incorporated herein by reference. Particularly suitable curing agents include, for example, dicyandiamide, diaminodiphenylsulfone, 2-methylimidazole, diethylenetoluenediamine, bisphenol A, tetrabromobisphenol A, phenolformaldehyde novolac resins, halogenated phenolformaldehyde resins, hydrocarbonphenol resins, combinations thereof and the like.

The amines suitably employed herein can be multifunctional aliphatic, such as, diethylene triamine or triethylenetetramine, or aromatic amines, such as, metaphenylene diamine or methylene dianiline. Some commercial curing agents useful in the present invention include, for example, D.E.H. TM 20 and D.E.H. TM 24 commercially available from The Dow Chemical Company.

Generally, the amounts of components (A) and (B) employed herein are sufficient to provide a cured product. Usually the amounts of components (A) and (B) which provide a ratio of equivalents of curing agent per epoxy groups of from about 0.5 to about 1.2; preferably from about 0.75 to about 1.1 and more preferably from about 0.95 to about 1.05 are used herein.

The present invention also provides a reaction product resulting from reacting, as a first component (A) a mixture of (1) at least one epoxy-containing compound exhibiting non-linear optical properties containing per molecule (a) at least two epoxy-containing groups attached to more than one nitrogen atoms which is attached to an aromatic ring and (b) at least one divalent electron-withdrawing group attached to an aromatic ring and (2) at least one epoxy-containing compound containing an average of more than one epoxide group per molecule; and, as a second component (B) at least one curing agent for component (A).

The component (A)(1) used herein is any of the glycidyl amine epoxy compounds having nonlinear optical properties described above with reference to Formulae I and II.

In general, the level of addition of NLO moieties to polymer will be as high as possible to maximize the NLO effect. The level at addition will be balanced by the stability and quality of the film desired to be produced. The range of percentages for incorporated NLO moieties is from about 0.5 percent to about 100 percent. Component (A)(2) of the present invention includes a wide variety of epoxy-containing compounds. Generally, component (A)(2) is any epoxy compound having an average of more than one epoxide group per molecule. Preferably, the component (A)(2) is any compound having an average of more than one vicinal epoxide group per molecule. More preferably, the component (A)(2) may be any compound containing an average of more than one glycidyl group per molecule. Even more preferably, the component (A)(2) can be glycidyl ethers, glycidyl esters or glycidyl amines.

Illustrative of the preferred glycidyl ethers used in the present invention are the glycidyl ethers of polyhydric phenols including for example, the glycidyl ethers of phenol or substituted phenol such as the aldehyde novolac resins particularly phenol-formaldehyde resins and cresol-formaldehyde resins. The glycidyl ethers of polyhydric phenols also may include the glycidyl ethers of bisphenols or substituted bisphenols such as the glycidyl ether of bisphenol A. Other examples of glycidyl ethers of polyhydric phenols useful in the present invention are described in U.S. Pat. No. 4,330,659 incorporated herein by reference, for example diglycidyl ethers of bisphenols corresponding to the formula:

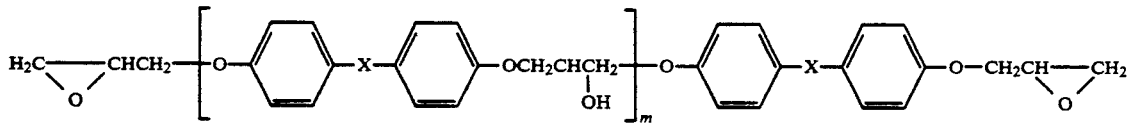

wherein m is from 0 to about 50 and X is —CH$_2$—,

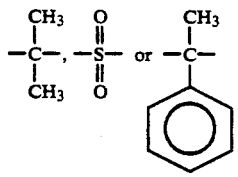

These represent, respectively, bisphenols F, A, S and AP. Other applicable ether include the diglycidyl ethers of resorcinol, catechol, hydroquinone, and the like. The various ethers may be substituted on the respective phenyl rings by such non-reactive substituents as alkyl, halogen, and the like. The glycidyl ethers of compounds having more than one aromatic hydroxyl group per molecule are disclosed in U.S. Pat. No. 4,829,133, incorporated herein by reference for the teachings of these epoxy resins. The glycidyl ethers of hydrocarbon-phenol resins disclosed in U.S. Pat. No. 4,710,429, incorporated herein by reference, may also be used in the present invention.

Component (A)(2) of the present invention also includes di- or polyepoxides of aliphatic or cycloaliphatic compounds containing more than one epoxidizable unsaturated group, for example, the diepoxides of cyclohexadiene, butadiene and the like.

Component (A)(2) used herein can be any combination of the aforementioned epoxy-containing compounds. Therefore, another embodiment of the present invention is the use of a mixture or a blend of epoxy-containing compounds. The epoxy compositions of component (A)(2) may contain the same or other moieties with electron-withdrawing groups.

The epoxy compound used herein as component (A)(2) may be an epoxy compound which does not exhibit a NLO response, an epoxy compound which does exhibit a NLO response or a combination thereof. For example, an epoxy compound which exhibits an NLO response and which may be used in the present invention may be any of the glycidyl amine epoxy-containing compounds described herein with reference to Formulae I and II, for example, such as tetraglycidylsulfonyldianiline.

Other epoxy-containing compounds suitably used herein as component (A)(2) can be a monomer, oligomer or polymer resin. Epoxy monomers and oligomer units suitably used herein as component (A)(2) are described in the *Encyclopedia of Chemical Technology*, vol. 9, pp 267–290, published by John Wiley & Sons, 1980. Examples of the epoxy resins suitably used herein include, for example, novolak epoxy resins such as cresolnovolak epoxy resins and epoxy phenol novolak resin; bisphenol-A epoxy resins such as diglycidyl ethers of bisphenol A; cycloalkyl epoxy resins; glycidyl amine resins; triazine resins; hydantoin epoxy resins and combinations thereof.

Some commercial epoxy resins useful in the present invention as component (A)(2) include, for example, D.E.R. ™ 331, D.E.R. ™ 332, D.E.R. ™ 383, D.E.N. ™ 431 and D.E.R. ™ 736, all commercially available from the Dow Chemical Company.

A solvent may be used, if desired, to dissolve an epoxy compound used herein for example when using certain solid epoxy resins. Suitable solvents which can be employed herein include, for example, glycol ethers, ketones, aromatic hydrocarbons, alcohols, amides, combinations thereof and the like. Particularly suitable solvents employed herein include, for example, methyl ethyl ketone, acetone, methanol, dimethylformamide, ethylene glycol methyl ether, propylene glycol methyl ether, combinations thereof and the like.

The present invention also provides a nonlinear optical material composition comprising the reaction product of aforementioned component (A) at least one epoxy-containing composition exhibiting non-linear optical properties containing per molecule (a) at least two epoxy-containing groups attached to more than one nitrogen atoms which is attached to an aromatic ring attached to an aromatic ring and at (b) least one divalent electron-withdrawing group attached to an aromatic ring; and as a second component, herein referred to as component (C), at least one compound containing an average of about two aromatic hydroxyl groups per molecule; wherein said resultant reaction product contains epoxy groups and said reaction product exhibits nonlinear optical properties. A reaction product of component (C) with components (A)(1) and (A)(2) described above is also included in the present invention.

Advanced resins of the nonlinear optical material of the present invention are prepared by reacting component (A) with component (C) a compound containing an average of about two aromatic hydroxyl groups per molecule. The aromatic hydroxyl-containing compounds (component (C)) and their formulas are disclosed in U.S. Pat. Nos. 3,477,990; 3,948,955 and 4,829,133, all incorporated herein by reference for their teachings of the aromatic hydroxyl-containing compounds.

Any of the compositions of the present invention advantageously exhibit a nonlinear optical response. Generally, the present invention includes a nonlinear optical material comprising an epoxy resin polymer based on the compositions of the present invention having nonlinear optical moieties chemically bonded in the resultant polymer. In carrying out any of the reaction processes of the present invention, for example when reacting component (A), with component (B), the reaction conditions are such that a nonlinear optical composition of the present invention is formed.

To fully incorporate a curing agent having a strong electron-withdrawing group, a catalyst may be advantageously used in the present invention. It is possible to carry out the reaction with a catalyst present to facilitate opening of the oxirane ring. For example, the catalyst can be 2-methyl imidazole. Preferably, the reaction is carried out in the presence of a catalyst because of the relative unreactivity of the aromatic amines of the first curing agent containing electron-withdrawing substituents.

Catalysts which are suitably used here include, for example, tetrabutylphosphonium acetate, boron trifluoride monoethylamine, benzyldimethyl amine, and 2-methyl imidazole. The catalyst 2-methyl imidazole is the most preferred because it tended to work without introducing additional ionic species into the product material. The reduction of ionic species in the polymer material is important for its reduction of conductivity which can lead to a catastrophic breakdown during the orientation process of the polymer product.

Suitable catalysts or promoters or accelerators which can be employed in the preparation of the compositions of the present invention may include, for example, tertiary amines, imidazoles, phosphonium compounds, ammonium compounds, sulfonium compounds, mixtures thereof and the like.

Suitable tertiary amines include, for example, triethylenediamine, N-methylmorpholine, triethylamine, tributylamine, benzyldimethylamine, tris(dimethylaminomethyl)phenol, mixtures thereof and the like.

Suitable imidazoles include, for example, 2-methylimidazole, 1-propylimidazole, mixtures thereof and the like.

Suitable phosphonium compounds include, for example, those disclosed by Dante et al. in U.S. Pat. No. 3,477,990, Perry in Canadian Pat. No. 893,191 and U.S. Pat. No. 3,948,855 and by Tyler, Jr. et al. in U.S. Pat. No. 4,366,295 all of which are incorporated herein by reference.

Suitable quaternary ammonium compounds include, for example, benzyl trimethyl ammonium chloride, benzyl trimethyl ammonium hydroxide, tetrabutyl ammonium chloride, tetrabutyl ammonium hydroxide, mixtures thereof and the like.

Reaction mixtures used in the present invention may be characterized by differential scanning calorimetry (DSC), nuclear magnetic resonance (NMR), high pressure liquid chromatography (HPLC), ultraviolet-visible (UV-VIS) absorption and size exclusion chromatography.

The reaction conditions used in the present invention will vary depending on the particular reactants used. Generally, the reactants, for example components (A) and (B), are mixed together to form a solution and then heated to a temperature such that the components will react. The reaction process of the present invention is preferably carried out at a temperature of from about room temperature (about 20° C.) to about 300° C. and more preferably from about room temperature to about 250° C. Above about 300° C. degradation of the epoxy polymer may occur and below about room temperature no reaction may occur. Optionally, the reactants are degassed to less than about $1 \times 10^{-2}$ Torr. The degassing is preferred to remove bubbles and moisture which may form in the reactants. The degassing is generally carried out a temperature at which the reactants have a reduced viscosity. While the degassing temperature depends on the reactants used, generally the degassing temperature is below the temperature of sublimation of reactants or below the reaction temperature. The reaction process of the present invention is preferably carried out under an inert atmosphere such as nitrogen. The reaction mixture is heated under nitrogen to until a substantially polymerized product is obtained. Generally, the period of time for the reaction depends on the kinetics of the particular reactants, but preferably the reaction time is less than 5 hours and more preferably less than 1 hour. The reacted mixture is then cooled to room temperature for use.

As an illustration of another embodiment of the process of the present invention, a prepolymer is first prepared by reacting component (A) with less than 100 percent of a first curing agent and then reacting the prepolymer with a second curing agent.

The second curing agent compound may be used to substantially completely react a prepolymer which has been prepared by reacting less than 100 percent of a first curing agent (an NLO moiety) with an epoxy resin. It is possible to completely use the prepolymer by continuing homopolymerization brought about by a catalyst. Preferably, the prepolymer is fully cured using a second curing agent such as metaphenylenediamine, because the final product exhibits certain improved properties obtained by using the second curing agent such as greater stability and higher glass transition temperature. The prepolymer is preferred because it provides a final product with improved properties such as film quality, optical clarity and stability. A sufficient amount of the second curing agent is added to the prepolymer to substantially react all of the remaining epoxy groups.

The present invention provides a thermoset polymeric composition with good thermal stability and resistance to chemical attack. It is also advantageous to provide epoxy based polymers having NLO properties because epoxy based polymers per se have heretofore been shown to have resistance to chemical attack. This property is provided by the crosslinking of the polymeric chains during polymerization.

The polymeric material of the present invention generally contains a glass transition temperature of from about 90° C. to about 300° C., preferably above about 140° C. and more preferably above about 160° C.

The present invention provides a composition with nonlinear optical properties with improved stability. The increased stability arises form the incorporation of a moiety with electron-withdrawing groups into the backbone of a polymer as opposed to blending a moiety with electron-withdrawing groups with a polymer host.

The epoxy based thermoset compositions of the present invention can be in the form of sheets, films, fibers or other shaped articles by conventional techniques. Generally, films are used in testing, electrooptic devices and waveguide applications.

A film can be prepared, for example, by constraining a mixture of components (A) and (B) between two planar substrates and then polymerizing the mixture to form a thin film. The films used for testing, electrooptic devices and waveguides should be thin films. Generally, the film has a thickness of from about 500 Angstroms to about 500 microns. Preferably, the thickness of the film is from about 1 micron to about 25 microns.

The reaction mixture of an epoxy resin with a curing agent (aromatic amines with electron-withdrawing groups), preferably with the addition of other curing agents is placed on a surface to make a film. The film may be produced in a number of ways. For many prepolymer mixtures with low viscosity a substrate is required. The mixture may be spread over the surface by compression with another substrate, dip, spray, or spin coating. Thermal processing of the mixture disposed on a substrate and the ultimate thermal and mechanical properties of the resultant polymer is dependent on the type of epoxy resin and curing agent utilized. The degree of stability required will then determine the type of polymer components needed. The techniques for mixing and polymerizing are similar to those known in the state of the art. One aspect of the polymerization which improves the mechanical properties of the film is the schedule of temperature ramping of the mixture to its final cure temperature. By staging the cure at intermediate temperatures the optimal network structure is obtained. Retaining the final cure temperature for a period of hours is often necessary for the most complete polymerization possible. The long term chemical and mechanical stability of the final polymer will be dependent on the network formed.

After the polymerization of the mixture, the resulting film is oriented to produce a film with anisotropic properties needed for second harmonic generation. Orientation of the film is provided by applying an external field to the film.

The term "external field" as employed herein refers to an electric, magnetic or mechanical stress field which is applied to a substrate of mobile organic molecules to induce dipolar alignment of the molecules parallel to the field.

For example, application of a DC electric field produces orientation by torque due to the interaction of the applied field and the net molecular dipole movement. AC and magnetic fields also can effect alignment. Mechanical stress induced alignment includes a physical method such as stretching a thin film or a chemical method such as coating a liquid crystalline surface with an aligning polymer such as nylon. The orientation can be achieved by corona poling or parallel plate poling. For parallel plate poling the film must be near and parallel to two electrodes with a large potential difference while the polymer is near to or above its glass transition. The electrodes can be associated with the substrate used for the formation of the film. For example, the substrate can be coated with a layer of indium-tin-oxide. If there are ionic impurities in the polymer mixture then the electrodes may be shielded with dielectric layer to prevent electrical breakdown. To obtain free standing films after the orientation process, a release layer is often deposited on the substrate before the mixture placed onto it. Other configurations involving air or vacuum gaps can also be used. The electric field continues to be applied until the temperature of the polymer is reduced to room temperature. This allows for the relaxation of the polymer to its highest density with while still having the field applied. This densification should improve any relaxation due to mobility of pendant side-chains within voids in the polymer.

Generally, in preparing NLO materials with second order susceptibility, $X^{(2)}$, the NLO functionalities in the polymer must have a net alignment for the polymer to exhibit NLO properties. Typically, an electric field is applied to orient the moieties in the polymer for nonlinear optical effect. This type of orientation is referred to herein as electric field poling, parallel plate poling, or poling. Other conventional methods for the orientation of the NLO moieties can be carried out by corona poling or through stretching the polymer.

In electric field poling, the polymeric material is raised above its glass transition temperature, Tg, because in this state, large molecular motion is enhanced, and the nonlinear optic moieties can give a net orientation. However, orientation of the polymer has been observed to occur below the Tg. An intense electric field is then applied to the polymeric composition to align the nonlinear optic moieties. Electric field strengths of between about 0.05 to about 1.5 megavolts per centimeter (MV/cm) can be applied. The film is then cooled to room temperature with the electric field still applied. The field is then removed, resulting in a system where the nonlinear optic moieties are aligned within the polymer matrix.

The orientation of the anisotropic units within the film can occur during or after polymerization. One method of orientation includes applying an electric field to a polymer film which has previously been prepared and polymerized.

Another method of orientation of the polymer of the present invention for producing nonlinear optical materials, includes polymerizing the polymer while the polymer is under an electric field such that the nonlinear optical moieties are aligned in the electric field before complete polymerization of the polymer takes place. This method of orientation will allow less stress on the ultimate polymer chain than if the electric field is applied after the NLO moieties are incorporated into the backbone of the polymer.

Another method for preparing thin films for nonlinear optical applications includes annealing of the polymer while simultaneously poling the polymer which will allow relaxation of the polymer around the oriented molecule. This process for producing an epoxy nonlinear optical polymeric film comprises raising the temperature of an epoxy polymeric film containing NLO moieties to above the glass transition temperature of the polymer, poling the film to orient the NLO moieties, lowering the temperature to below the glass transition temperature, and annealing for a period of time whereby a stable NLO polymeric film is obtained. After the temperature of a polymer has been raised to above the Tg and the polymer has been poled, the temperature is reduced from about 10° C. to about 30° C. below the Tg and maintained at this lower temperature to allow for densification. This "annealing" step is carried out so as to cause a reduced free volume in the film and thus less room for NLO moieties to randomly reorient themselves which can lead to a decrease in the NLO signal. Thus, this annealing process during polymer orientation may advantageously improve the stability of the polymer.

The nonlinear optical response of a polymer is determined by the susceptibility of the polymer to polarization by an oscillating electromagnetic field. The most important polarization components of a medium in contact with an electric field are the first order polarization components, i.e., the linear polarization, the second order polarization, i.e., the first nonlinear polarization, and the third order polarization, i.e., the second nonlinear polarization. On a macroscopic level this can be expressed as:

$$P = \chi^{(1)} E(\omega_1) + \chi^{(2)} E(\omega_1) E(\omega_2) + \chi^{(3)} E(\omega_1)(\omega_2)(\omega_3)$$

where

P is the total induced polarization
E is the electric field at the frequency $(\omega_i)$, and
$\chi^i$ are the susceptibility tensors for the linear, and first and second order nonlinear component of the polarization.

Specific components of the susceptibility tensor can be related to measurable coefficients. For second harmonic generation the second harmonic coefficient $d_{ijk}$ is defined by:

$$d_{ijk}(-2\omega; \omega, \omega) = (\tfrac{1}{2}) X_{ijk}(-2\omega; \omega, \omega)$$

Because of the degeneracy of two of the fields in second harmonic generation, the standard notation for writing this coefficient is $d_{iu}(-2\omega; \omega, \omega)$. For the specific case where polymer films are oriented with their anisotropic components normal to the film surface the coefficient $d_{33}$ can be determined as detailed in Applied Physics Letters vol. 49 (5) p. 248-250 (1986). From a knowledge of the susceptibilities the molecular polarizabilities can be calculated if the molecular dipole moment, the number density of the nonlinear molecules, the internal electric field, and correction factors for local field effects are known. This calculation, also detailed in the above article, allows the determination of the first order hyperpolarizability, $\beta$, and the second order hyperpolarizability, $\gamma$. To achieve a significant second order polarization it is essential that the nonlinear medium exhibit second order susceptibility, $X^{(2)}$, be greater than $10^{-9}$ esu. To achieve a significant third order polarization it is essential that the nonlinear medium exhibit third order susceptibility, $X^{(3)}$, be greater than $10^{-13}$ esu.

A number of optical tests can be used to evaluate the nonlinear optical properties of the poled polymer films of the present invention. For example, the second order susceptibility components of the polymer can be tested by measuring the linear Pockels electro-optic effect, second harmonic generation (SHG), or frequency mixing. For example, the third order susceptibility components of the polymer can be measured by third harmonic generation (THG), nonlinear mixing, Kerr effect, degenerate four wave mixing, intensity dependent refractive index, self-focusing, quadratic Kerr electro-optic effect, and electric field induce second harmonic generation. Such optical tests and procedures are well known to those skilled in the art.

The Maker fringe technique is a conventional procedure used herein to determine the second order susceptibility properties of films. In accordance with this test procedure, the magnitude of the intensity of the light generated at the second harmonic of the incident frequency by the polymeric film sample can be measured as a function of the incident angle of the light irradiating the sample surface. If the film is oriented such that the anisotropic groups have a net orientation normal to the surface the largest second harmonic coefficient, $d_{33}$, can be determined using p-polarized incident radiation.

Typically a Q-switched Yd:YAG laser which emits electromagnetic radiation at 1.064 microns, has a pulse half width of 14 ns, a repetition rate of 10 Hz, and is p-polarized, is focused onto a sample on the rotation axis of a rotary stage. The light emitted from the sample is filtered to remove the incident frequency and a spike filter centered near the second harmonic to allow passage of substantially only the second harmonic. Typically, the spike filter is centered at 530 nm and has a half width of 10 nm. The light is detected by a photomultiplier and averaged by a boxcar which is triggered by the incoming laser pulse. The averaged output of the boxcar was collected by a computer as a function of the angle of incidence of the incident beam on the sample.

The second harmonic coefficient is calculated using the equations described in Applied Physics Letters volume 49, page 248-250 (1986) by K. Singer et al. The incident energy density on the sample is obtained by calibration with a known quartz sample. A Y cut quartz slab is placed on the rotation stage in the same position as the polymer sample to be tested. The energy density is calculated from the given equations knowing the coefficient $d_{11} = 1.1 \times 10^{-9}$ esu. The intensity as a function of incident angle for the polymer test sample is then fit by the computer with the additional information of incident energy density, film thickness, and indices of refraction at the incident and second harmonic wavelength.

The polymers of the present invention have high stability (both thermal and chemical). An important feature of the NLO polymers derived from epoxy resins of the present invention is an added stability of the NLO signal of said polymers because the NLO groups are covalently bound into the polymer chain. This improvement of the stability is related to the level of crosslinking of the polymer chain.

Enhanced stability may be determined by observing the decay of the NLO capabilities as a function of time at room temperature. However, this determination may be very time consuming. A more straight forward approach to determining stability is to observe the NLO signal at room temperature after exposure to elevated temperatures for periods of time necessary to allow relaxation of the NLO effect. It has been found that the relaxation of the NLO effect is very rapid and the level is dependent on the temperature. The higher the temperature before relaxation of the NLO effect the more stable the polymer will be at room temperature. It is possible to calculate an activation energy for the relaxation of a particular NLO polymer. Another measure of the stability of a polymer's NLO effect is the ability to retain a certain percentage of its original NLO activity after exposure to an elevated temperature. One standard percentage would be 67.5 percent of the original value. The definition of a "stable" NLO polymer herein means the ability to retain greater than about 67.5 percent of its original NLO activity after exposure up to a specified maximum temperature for 15 minutes.

Nonlinear optical materials have many potential applications using harmonic generation for shifting laser light to shorter wavelengths, parametric oscillation for shifting laser light to longer wavelengths, phase conjugation (four-wave mixing), and sum frequency generation for applications such as modulation and switching of light signals, imagining/processing/correlation, optical communications, optical computing, holographic optical memories, and spatial light modulators.

The films of the present invention are particularly useful in the electronic and communications fields to alter incident electromagnetic waves by the optical properties of the films. More particularly, the films of the present invention are used for waveguides and electrooptic modulators.

In another embodiment of this invention, there is provided en electrooptic light modulator or optical parametric device with a (noncrystalline second order) polymeric nonlinear optical component and a means for providing an optical input to and output from said component. The component comprises an optically transparent medium of a polymer characterized by the compositions of the present invention. When the device is employed in an electrooptic mode it includes means for applying an electric field and/or optical input to said element for altering an optical property.

One problem in obtaining an optically nonlinear medium for device applications is the difficulty in providing stable uniform crystalline structures and thin films of such materials in a manner suitable for integrated devices. A media has been developed which is used in electrooptic and optical parametric devices which provide improved stability by means of incorporation of NLO active functionalities into the backbone of noncrystalline epoxy based polymers.

The basis for any nonlinear optical device is the nonlinear optical medium therein. It has been found that to obtain a long lived polymeric media comprising an oriented second order nonlinear material that the NLO active component must be bound into the polymer chain to provide the stabilization to thermal forces which would randomize the orientation. Such a nonlinear optical media can be prepared directly on a desired substrate or can be a free standing film or tape. It may be noted that this optically nonlinear media can be utilized as an optical waveguide incorporated into electrooptic devices.

Media which can be used in electrooptic devices are described in the following examples. The films suitable for use in electrooptic devices may be either free standing or on substrates. The substrates may be rigid as in the case of glass, quartz, aluminum, silicon wafer, or indium-tin-oxide coated glass. For use in waveguide devices the NLO media must be adjacent to another media suitable for waveguiding conditions, for example, other polymeric materials with a lower index of refraction, such as, fluorinated hydrocarbon materials, or quartz or glass substrates. Electrodes of conductive material with a higher index of refraction may be coated with polymeric materials of lower index to allow electrooptic modulation.

The following examples are for illustrative purposes only and are not to be construed as limiting the scope of the invention in any manner.

EXAMPLE 1

A. Preparation of Epoxy Resin

An epoxy resin based on diamino diphenylsulfone (DADS) molecule was produced according to the procedure disclosed in SAMPE Quarterly, October 1985, page 21 as follows:

30.0 g of DADS (Aldrich), 7 ml HOAC, and 120 ml epichlorohydrin (Aldrich) were heated for about 30 hours at 50° C. and then cooled. Excess epichlorohydrin and HOAC were stripped off and the residue taken into 100 ml MEK. The solution was taken to reflux and 80 g of 50% aqueous NaOH was added over a 2 hour period in 20 g aliquots. The solution was cooled and the organic layer was separated, washed with water two times, and then dried with $MgSO_4$ and stripped to form a yellow/orange oil. The oil was titrated using the pyridine-HCl method. The epoxide equivalent weight (EEW) equaled 156 g (theoretical=118). The product was characterized by proton NMR.

B. Preparation of Nonlinear Optical Polymer Films

A polymer film was produced by mixing 2.695 g of the tetraglycidyl amine of diamino diphenyl sulfone (DADS-TGA) synthesized in Part A of this example with 1.10 g of DADS in a 100 ml boiling flask. This mixture was heated to 140° C. under a reduced pressure of at least $10^{-2}$ Torr to dissolve the DADS into the epoxy resin. The mixture was reduced to near room temperature and a small amount was placed between two quartz slides each one having a thickness of 125 microns. In addition, a 25 micron polyimide space layer was placed between the quartz slides to retain a constant thickness. This combination of epoxy resin and curing agent sandwiched between two quartz slides was placed between two parallel electrodes and the entire assembly was placed in an oven. The temperature was slowly raised to 240° C. at which time a voltage of 6000 volts was applied across the electrodes to produce about a 200,000 v/cm electric field. The temperature and field were retained on the sample for about 2 hours. The temperature of the sample was then reduced to room temperature over a period of about 6 hours. The field was left in place during this time and at room temperature for a period of about 12 hours. Differential scanning calorimetry on similarly prepared samples indicated no glass transitions below the start of polymer degradation near 280° C.

C. Measurement of the Nonlinear Optical Properties

The oriented polymer was removed from the electrode fixture and affixed to a stainless steel holder to allow reproducible positioning of the sample on the rotation stage for testing of the second harmonic capabilities using a Maker fringe technique. The sample was illuminated by a 1.064 micron wavelength laser beam having a 14 ns half width and a 10 Hz repetition rate. The beam was focused onto the sample which was mounted on the center of rotation of a rotary stage. The light emitted from the sample was filtered to remove the incident frequency and a spike filter centered at 530 nm and having a half width of 10 nm to allow passage of substantially only second harmonic light generated within the sample. The light was detected by a photomultiplier and averaged by a boxcar which was triggered by the incoming laser pulse. The averaged output of the boxcar was collected as a function of the angle of incidence of the incident beam on the sample. The second harmonic coefficient was calculated using the equations described in Applied Physics Letters volume 49, page 248–250 (1986) by K. Singer et al. This calculation requires the film thickness, the index of refraction at 1.064 microns which was about 1.63 and the index at 532 nm which was about 1.60, and the energy density of the incident laser beam. The incident energy density was calculated by using a Y cut quartz crystal having a $d_{11} = 1.1 \times 10^{-9}$ esu. The quartz sample was placed in the same position as the polymer sample immediately before testing. Knowing the second harmonic coefficient and indices of refraction of quartz the incident energy density can be calculated. Using these values the second harmonic coefficient was estimated to be about $1 \times 10^{-9}$ esu.

D. Thermal Stability Measurements of Nonlinear Optical Film

The stability of the film was measured by its ability to retain NLO activity after exposure to elevated temperatures. The film described above was placed in an oven for a period of 30 minutes at an elevated temperature and then removed and tested as described in Part C above for second harmonic capability after the sample had returned to room temperature. The results of this testing are given in Table 1.

TABLE 1

| Temperature (°C.) | Second Harmonic Coefficient (% relative) |
|---|---|
| 22 | 100 |
| 50 | 100 |
| 75 | 98 |
| 100 | 100 |
| 125 | 95 |
| 150 | 91 |
| 175 | 74 |
| 200 | 57 |
| 225 | 33 |

This table shows that the DADS-TGA polymer cured with DADS is stable to 175° C., i.e., it retained greater than 67 percent of its original second harmonic coefficient after exposure to a temperature of 175° C. The values of this table have an estimated error of about plus or minus 5 percent.

EXAMPLE 2

The 3.276 g of the epoxy resin produced in Example 1, DADS-TGA, was combined with 0.520 g of triethylene tetramine having an amine equivalent weight of 24. This mixture was dissolved in 20 ml of methylene chloride. A quartz slide having a thickness of about 125 microns was attached to a translation stage and was dipped into and pulled out of this solution at a constant rate of about 2 mm/sec. The resin and curing agent was removed from one side of the quartz slide by solvent washing. The samples were heated in a clean room oven at 100° C. for 30 minutes and 160° C. for one hour. This sample was further dried in a vacuum oven having a pressure of about $10^{-3}$ Torr at a temperature of about 100° C. The polymer coated quartz slides were oriented by placing the slide between two electrodes. A 12.5 micron spacer was placed adjacent to the polymer side of the quartz slide to prevent direct contact of the electrode with the polymer surface. The sample was then heated to 175° C. with an electric field strength of about 500,000 V/cm. The sample was cooled slowly to room temperature with the field applied. The glass transition of a polymer sample prepared from the reactant solution was very broad with a mid-point of the transition centered near 150° C.

The second harmonic coefficient of this sample was measured using the same Maker fringe technique described in Example 1. The film thickness of this film was measured to be about 0.88 microns. The second harmonic coefficient, $d_{33}$, was calculated to be about $6 \times 10^{-9}$ esu.

What is claimed is:

1. A nonlinear optical material comprising an epoxy-containing composition represented by the following formula:

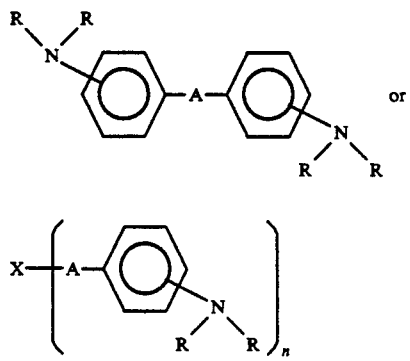

wherein A is a divalent electron-withdrawing group, n is 2 or 3; each R is independently a hydrogen, an epoxy-containing group, or an aliphatic or aromatic hydrocarbon having from 1 to about 12 carbon atoms, with the proviso that at least two R groups each on different nitrogen atoms must be epoxy-containing groups and X is a divalent or trivalent organic hydrocarbon, hetero-interrupted hydrocarbon, or substituted hydrocarbon radical or

said nonlinear optical material exhibiting a second order susceptibility of greater than $10^{-9}$ esu.

2. The nonlinear optical material of claim 1 wherein the epoxy-containing groups are glycidyl groups.

3. The nonlinear optical material of claim 1 characterized by the following formula:

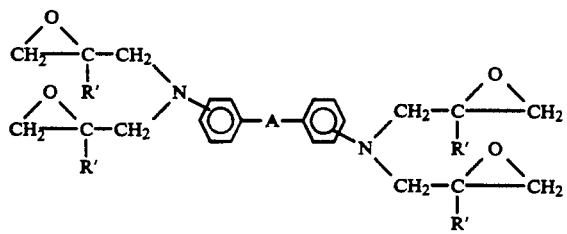

wherein A is a divalent electron-withdrawing group and each R' is independently a hydrogen or a alkyl group containing from 1 to about 4 carbon atoms.

4. The nonlinear optical material of claim 1 wherein the divalent electron-withdrawing group is selected from the group consisting of

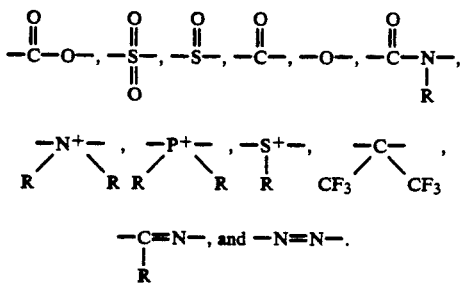

wherein R is independently hydrogen or an aliphatic or aromatic hydrocarbon having from 1 to about 12 carbon atoms.

5. The nonlinear optical material of claim 3 wherein A is $SO_2$ and R' is hydrogen.

6. The nonlinear optical material of claim 3 wherein A is CO and R' is hydrogen.

7. A nonlinear optical composition comprising the reaction product of at least one epoxy-containing composition (A), represented by the formula:

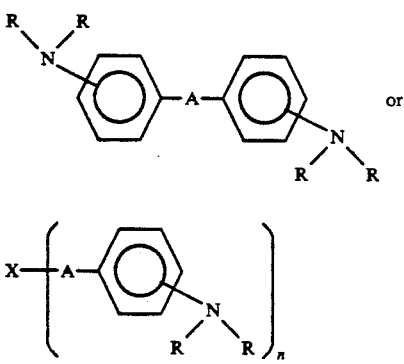

wherein A is a divalent electron-withdrawing group, n is 2 or 3, X is a divalent or trivalent organic hydrocarbon, hetero-interrupted hydrocarbon, or substituted hydrocarbon radical or and each R is independently a hydrogen, an epoxy-containing group, or an aliphatic or aromatic hydrocarbon having from 1 to about 12 carbon atoms, with the proviso that at least two R groups each on different nitrogen atoms must be epoxy-containing groups; and (B) at least one curing agent for (A); said nonlinear optical composition exhibiting a second order susceptibility of greater than $10^{-9}$ esu.

8. The nonlinear optical composition of claim 7 wherein the epoxy-containing groups are glycidyl groups.

9. The nonlinear optical composition of claim 7 wherein component (A) is represented by the following formula:

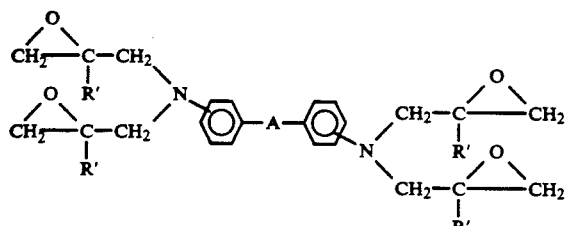

wherein A is a divalent electron-withdrawing group and each R' is independently a hydrogen or a alkyl group containing from 1 to about 4 carbon atoms.

10. The nonlinear optical composition of claim 9 wherein the amine group is in a para position relative to the electron-withdrawing group A.

11. The nonlinear optical composition of claim 7, wherein the divalent electron-withdrawing group is selected from the group consisting of

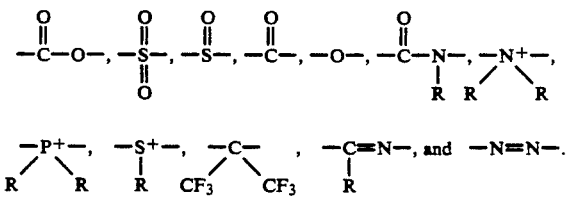

wherein R is independently hydrogen or an aliphatic or aromatic hydrocarbon having from 1 to about 12 carbon atoms.

12. The nonlinear optical composition of claim 9 wherein A is $SO_2$ and R' is hydrogen.

13. The nonlinear optical composition of claim 9 wherein A is CO and R' is hydrogen.

14. The nonlinear optical composition of claim 7 wherein the curing agent is selected from the group consisting of amines, amides, sulfides, anhydrides and combinations thereof.

15. The nonlinear optical composition of claim 14 wherein the curing agent exhibits a nonlinear optical response.

16. The nonlinear optical composition of claim 7 wherein component (A) further comprises a second epoxy-containing compound (A)(2) containing an average of more than one epoxide group per molecule.

17. The nonlinear optical composition of claim 16 wherein the epoxy-containing groups of component (A) are glycidyl groups.

18. The nonlinear optical composition of claim 16 wherein the component (A)(2) is an epoxy compound containing an average of more than one glycidyl group per molecule.

19. The nonlinear optical composition of claim 18 wherein the epoxy compound is selected from the group consisting of glycidyl ethers, glycidyl esters and glycidyl amines.

20. The nonlinear optical composition of claim 19 wherein the epoxy compound is a glycidyl ether of a bisphenol or substituted bisphenol.

21. The nonlinear optical composition of claim 20 wherein the epoxy compound is a glycidyl ether of 4,4'-isopropylidene diphenol.

22. The nonlinear optical composition of claim 16 including a catalyst.

23. The nonlinear optical composition of claim 22 wherein the catalyst is selected from the group consisting of tertiary amines, phosphonium compounds, ammonium compounds, sulfonium compounds, and mixtures thereof.

24. A nonlinear optical composition comprising the reaction product of component (A) represented by the following formula:

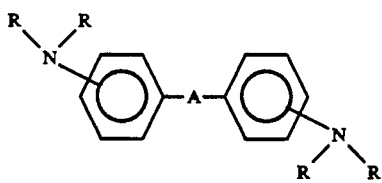

or

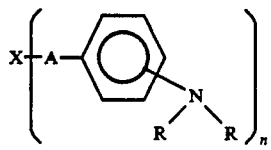

wherein A is a divalent electron-withdrawing group, n is 2 or 3, X is a divalent or trivalent organic hydrocarbon, hetero-interrupted hydrocarbon, or substituted hydrocarbon radical or

and each R is independently a hydrogen, an epoxy-containing group, or an aliphatic or aromatic hydrocarbon having from 1 to about 12 carbon atoms, with the proviso that at least two R groups each on different nitrogen atoms must be epoxy-containing groups; and (C) at least one compound containing an average of about two aromatic hydroxy groups per molecule; said nonlinear optical composition exhibiting a second order susceptibility of greater than $10^{-9}$ esu, wherein said reaction product contains epoxy groups.

25. The nonlinear optical composition of claim 24 wherein the epoxy-containing groups are glycidyl groups.

26. The nonlinear optical composition of claim 24 wherein component (A) is represented by the following formula:

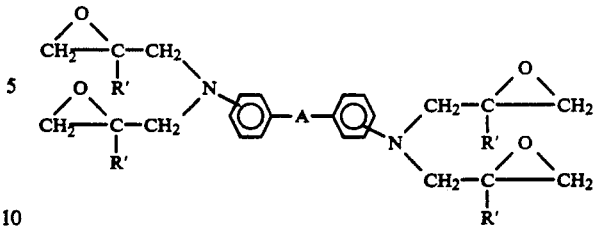

wherein A is a divalent electon-withdrawing group and each R' is independently a hydrogen or a alkyl group containing from 1 to about 4 carbon atoms.

27. The nonlinear optical composition of claim 24 wherein A is selected from the group consisting of

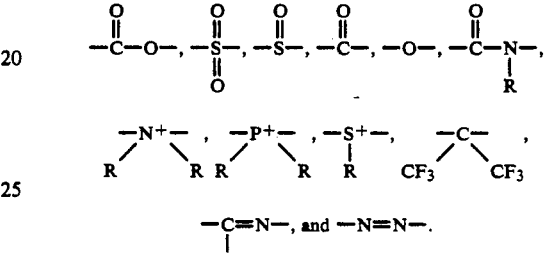

wherein R is independently hydrogen or an aliphatic or aromatic hydrocarbon having from 1 to about 12 carbon atoms.

28. The nonlinear optical composition of claim 26 wherein A is $SO_2$ and R' is hydrogen.

29. The nonlinear optical composition of claim 26 wherein A is CO and R' is hydrogen.

30. The nonlinear optical composition of claim 24 including at least a first curing agent.

31. The nonlinear optical composition of claim 30 wherein the first curing agent is selected from the group consisting of amines, amides, sulfides, anhydrides and combinations thereof.

32. The nonlinear optical composition of claim 30 further including a second curing agent.

33. The nonlinear optical composition of claim 32 wherein the second curing agent is selected from the group consisting of amines, amides, sulfides, anhydrides and combinations thereof.

34. The nonlinear optical composition of claim 30 or 32 wherein the first and/or second curing agent exhibits a nonlinear optical response.

35. The composition of claims 10, 21 or 24 having a stable NLO signal at temperatures below 180° C.

36. An article having nonlinear optical properties comprising a substrate coated with the material or composition of claim 1 or 16.

37. A particle, film fiber or sheet of the material or composition of claim 1 or 16.

38. A device having the nonlinear optical material or composition of claim 1 or 16 incorporated therein.

39. A waveguide having as one component a nonlinear optical material or composition of claim 1 or 16.

* * * * *

UNITED STATES PATENT AND TRADEMARK OFFICE
CERTIFICATE OF CORRECTION

PATENT NO. : 5,266,365
DATED : November 30, 1993
INVENTOR(S) : John J. Kester and Craig Silvis It is certified that error appears in the above-identified patent and that said Letters Patent is hereby corrected as shown below:

Column 24, line 52, delete "10, 21" and insert therefore -- 7, 16 --.

Signed and Sealed this

Twentieth Day of September, 1994

Attest:

BRUCE LEHMAN

Attesting Officer     Commissioner of Patents and Trademarks